US012554497B2

(12) United States Patent
Reeves

(10) Patent No.: US 12,554,497 B2
(45) Date of Patent: Feb. 17, 2026

(54) FUSED COMPARISON ADD INSTRUCTIONS

(71) Applicant: Advanced Micro Devices, Inc., Santa Clara, CA (US)

(72) Inventor: Steven Isaac Reeves, Truckee, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 6 days.

(21) Appl. No.: 18/606,865

(22) Filed: Mar. 15, 2024

(65) Prior Publication Data
US 2025/0291594 A1 Sep. 18, 2025

(51) Int. Cl.
*G06F 9/30* (2018.01)
(52) U.S. Cl.
CPC ........ *G06F 9/30098* (2013.01); *G06F 9/3001* (2013.01); *G06F 9/30021* (2013.01)
(58) Field of Classification Search
None
See application file for complete search history.

(56) References Cited

U.S. PATENT DOCUMENTS

| 11,487,541 | B2 | 11/2022 | Corbal et al. | |
| 11,693,657 | B2 | 7/2023 | Yudanov et al. | |
| 11,934,834 | B2* | 3/2024 | Mirkes | G06F 9/3836 |
| 2009/0019262 | A1* | 1/2009 | Tashiro | G06F 9/3004 712/214 |
| 2022/0066760 | A1* | 3/2022 | Chang | G06N 3/063 |
| 2022/0129752 | A1 | 4/2022 | Lagudu et al. | |
| 2023/0305844 | A1* | 9/2023 | Tyrlik | G06F 9/30038 |

* cited by examiner

*Primary Examiner* — Eric Coleman
(74) *Attorney, Agent, or Firm* — Kowert, Hood, Munyon, Rankin & Goetzel, P.C.; Rory D. Rankin

(57) ABSTRACT

An apparatus, system, and method for efficiently processing pairs of operations repeatedly used in applications. In various implementations, a computing system includes a parallel data processing circuit with multiple compute circuits. Each of the compute circuits includes multiple lanes of execution, each with a corresponding arithmetic logic unit (ALU). The ALU supports executing a single fused conditional ternary instruction that replaces two separate instructions that provide two operations (comparison and add). When executing the fused conditional ternary instruction, the ALU does not retrieve the intermediate result from the scalar register file, the vector register file, or bypass circuitry located externally from the ALU. Rather, the ALU generates the intermediate result and uses the intermediate result without routing the intermediate result externally from ALU.

20 Claims, 5 Drawing Sheets

FUSED COMPARISON ADD INSTRUCTIONS

BACKGROUND

Description of the Relevant Art

Neural networks are used in a variety of applications in a variety of fields such as physics, chemistry, biology, engineering, social media, finance, and so on. Neural networks use one or more layers of nodes to classify data in order to provide an output value representing a prediction when given a set of inputs. Weight values are used to determine the amount of influence that a change in a particular input data value will have upon a particular output data value within the one or more layers of the neural network. The cost of using a trained neural network includes providing hardware resources that can process the relatively high number of computations and can support the data storage and the memory bandwidth for accessing parameters. The parameters include the input data values, the weight values, the bias values, and the activation values.

The next generation of artificial intelligence (AI) applications will rely on tasks for graph processing and for generating new graphs. One of the uses of graphs machine learning (GML) data models is to compress large sparse graph data structures to generate prediction and inference values. Graph neural networks (GNNs) are used to accomplish this generation. These tasks use a different form of generalized matrix multiplication (GEMM) operations that replace multiplication with minimization. These minimization operations rely on conditional ternary operations. A ternary operation is an operation that receives three source operands as input and generates a single result output. A conditional ternary operation includes a condition that when evaluated, indicates which source operand to discard and which source operand to combine with another source operand.

Typically, the condition of conditional ternary operations causes a comparison operation to be performed. For example, a conditional ternary operation can include a source operand being summed with a maximum of two other source operands. Other comparison operations can be used such as finding a minimum of the two other source operands. Therefore, the conditional ternary operation relies on a comparison operation that is paired with the addition operation. The comparison operation or the addition operation can be initially performed depending on the overall conditional ternary operation.

Additionally, a variety of activation functions used in machine learning data models contain a conditional ternary operation such as a comparison operation followed by an addition operation. Further, reduction operations of data can include generating an average value of maximum values of two datasets. These reduction operations also rely on a conditional ternary operation that includes a comparison operation paired with an addition operation. When operations that are repeatedly performed in an application are not efficient, data storage of the source code increases, and throughput of the application reduces. If an organization cannot support the cost of using machine learning data models, then the organization is unable to benefit from the machine learning data models.

In view of the above, efficient methods and apparatuses for efficiently processing pairs of operations repeatedly used in applications are desired.

Figure 1:
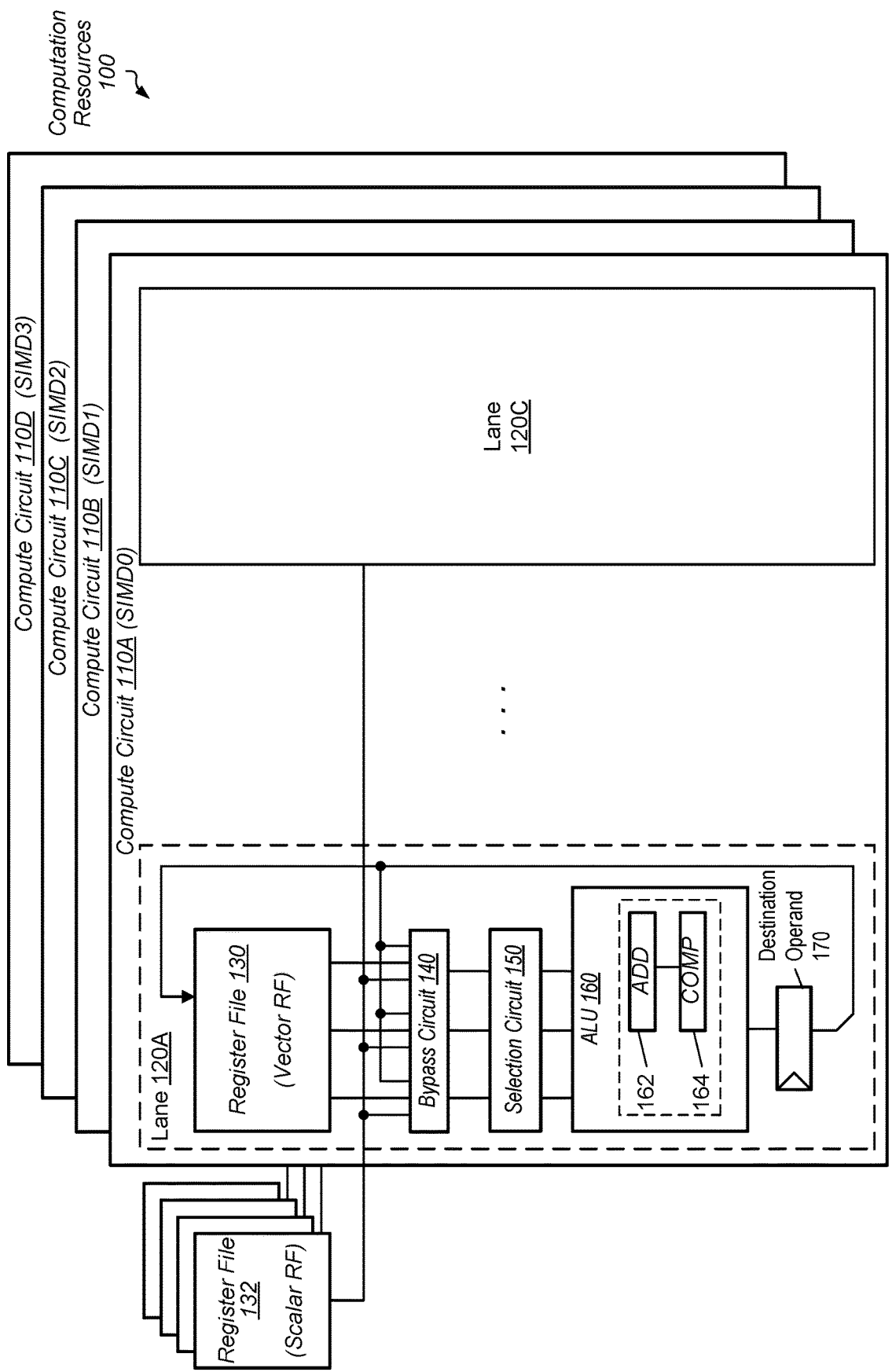
FIG. 1 is a generalized diagram of computing resources that efficiently process pairs of operations repeatedly used in applications.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for efficiently processing pairs of operations repeatedly used in applications are contemplated. In various implementations, a computing system includes a parallel data processing circuit with multiple compute circuits. Each of the compute circuits includes multiple lanes of execution, each with a corresponding arithmetic logic unit (ALU). The ALU supports executing a single fused conditional ternary instruction that replaces two separate instructions that provide two operations (comparison and add). The fused instruction can include the following format: d=(a comp b)? a+c:b+c. The pair of operations include a comparison operation followed by the addition operation. The comparison operation generates a result based on two of the three source operands, such as the source operands "a" and "b." The comparison operation uses one of multiple comparison types such as a greater than (>) comparison, a greater than or equal to (>=) comparison, a less than (<) comparison, and a less than or equal to (<=) comparison. The operator "comp" of the fused instruction would be replaced with one of the multiple comparison types.

When executing the fused conditional ternary instruction, the ALU does not retrieve the intermediate result from the scalar register file, the vector register file, or bypass circuitry located externally from the ALU. Rather, the ALU generates the intermediate result and uses the intermediate result without routing the intermediate result externally from ALU. The ALU maintains the intermediate result within the ALU due to the two operations (comparison and add) not being used in two separate instructions, but rather, used within the single fused conditional ternary instruction. Moving the two operations (comparison and add) from two separate instructions into the single fused conditional ternary instruction reduces the number of instructions in an application, reduces the size of function calls (libraries), and increases performance. Further details of these techniques to efficiently process pairs of operations repeatedly used in applications are provided in the following description of FIGS. 1-5.

Turning now to FIG. 1, a generalized block diagram of one implementation of computation resources 100 is shown. In the illustrated implementation, computation resources 100 includes the multiple compute units 110A-110D, each with multiple lanes 120A-120C. Each lane is also referred to as a single instruction multiple data (SIMD) unit or a SIMD lane. In various implementations, the hardware, such as circuitry, of each of compute circuits 110B-110D is an instantiation of the hardware of compute circuit 110A. Similarly, the hardware of lane 120C is an instantiation of the hardware of lane 120A. The components in lanes 120A-120C operate in lockstep. Although a particular number of compute circuits 110A-110D and lanes 120A-120C are shown, in other implementations, another number of these components are used based on design requirements.

In some implementations, the parallel computational lanes 120A-120C operate in lockstep. In various implementations, the data flow within each of the lanes 120A-120C is pipelined. Pipeline registers are used for storing intermediate results. Within a given row across lanes 120A-120C, arithmetic logic unit (ALU) 160 includes the same circuitry and functionality, and operates on a same instruction, but different data associated with a different thread. A particular combination of the same instruction and a particular data item of multiple data items is referred to as a "work item." A work item is also referred to as a thread. The multiple work items (or multiple threads) are grouped into thread groups, where a "thread group" is a partition of work executed in an atomic manner.

In some implementations, a thread group includes instructions of a function call that operate on multiple data items concurrently. Each data item is processed independently of other data items, but the same sequence of operations of the subroutine is used. As used herein, a "thread group" is also referred to as a "work block" or a "wavefront." Tasks performed by computation resources 100 can be grouped into a "workgroup" that includes multiple thread groups (or multiple wavefronts). The hardware, such as circuitry, of a scheduler divides the workgroup into separate thread groups (or separate wavefronts) and assigns the thread groups to the compute circuits 110A-110D.

In an implementation, lane 120A includes vector register file 130 for storing operand data for vector operations. In one implementation, the lanes 120A-120C also share the scalar register file 132 that stores operands for scalar operations. Scalar data values are common to each work item in a wavefront. In other words, a scalar data operand is used by each of the lanes 120A-120C at the same time. In contrast, a vector data operand is a unique per work item value, so each of the lanes 120A-120C do not work on the same copy of the vector data operand. In one implementation, one or more instructions use vector data operands and generate a scalar result. Therefore, although not shown, the result data from destination operand 170 is also routed to scalar register file 132 in some implementations.

Bypass circuit 140 includes selection circuitry, such as multiplexers, or mux gates, for routing result data from destination operand 170 to selection circuit 150 without retrieving operand data from vector register file 130 or scalar register file 132. Therefore, the ALU 160 can begin operations sooner. Selection circuit 150 also includes multiplexers and possible crossbar circuitry to route source operands to particular inputs of operations being performed by ALU 160. In various implementations, lane 120A is organized as a multi-stage pipeline. Intermediate sequential elements, such as staging flip-flop circuits, registers, or latches, are not shown for ease of illustration.

ALU 160 can include a variety of execution circuits. In the illustrated implementation, ALU includes an adder 162 and a comparator 164. Although not shown, ALU 160 can include a variety of other types of execution circuits such as a multiplier, a norm functional circuit, a rounding functional circuit, a clamping circuit, a divider circuit, a square root function circuit, and so forth. ALU 160 can also include circuitry that supports a variety of mathematical operations such as integer mathematical operations, Boolean bit-wise operations, and floating-point mathematical operations. Although a single staging sequential element is shown for destination operand 170, in other implementations, lane 120A uses multiple stages of sequential elements to route the result data to bypass circuit 140, scalar register file 132, and vector register file 130.

In various implementations, the adder 162 and the comparator 164 are used to implement a fused instruction that includes a conditional ternary operation. In various implementations, the fused instruction can include the following format: d=(a comp b)? a+c:b+c. The pair of operations include a comparison operation followed by an addition operation. The comparison operation can generate a result based on two of the three source operands, such as the source operands "a" and "b," and one of multiple comparison types such as a greater than (>) comparison, a greater than or equal to (>=) comparison, a less than (<) comparison, and a less than or equal to (<=) comparison. The operator "comp" of the fused instruction would be replaced with one of the multiple comparison types.

The conditional operator "?" is used to indicate a conditional expression, and the conditional operator "?" indicates a selection occurs between the two source operands such as the source operands "a" and "b." For example, only one of the two source operands ("a" or "b") is combined with the third operand "c" in a second operation. In this implementation, the second operation is an addition operation. Therefore, only one of the two source operands ("a" or "b") is summed with the third operand "c." In other implementations, the second operation is a subtraction operation or another type of operation. One or more of the source operands "a," "b," and "c" can be an integer type or a floating-point type. One or more of the source operands "a," "b," and "c" can be a positive value or negative value.

The circuitry of ALU 160 generates a single result of the fused conditional ternary instruction by performing the two operations that include at least the comparison operation used in the conditional expression. When executing the fused conditional ternary instruction, the ALU 160 does not retrieve the intermediate result from the scalar register file 132 or the vector register file 130. In various implementations, when executing the fused conditional ternary instruction, the ALU 160 does not retrieve the intermediate result from bypass circuit 140. Rather, the ALU 160 generates the intermediate result and uses the intermediate result without routing the intermediate result externally from ALU 160.

The ALU 160 maintains the intermediate result within ALU 160 due to the two operations (comparison and add) are not used in two separate instructions, but rather, used within the single fused conditional ternary instruction. The ALU 160 sends the single result of the fused instruction to the vector register file 130.

In one implementation, the computation resources 100 are used in a parallel data processing circuit such as a graphics processing unit (GPU), a digital signal processor (DSP), a field programmable gate array (FPGA), or otherwise. Parallel data processing circuits are efficient for data parallel computing found within loops of applications, such as in applications for computer and mobile device display graphics, molecular dynamics simulations, deep learning training, finance computations, and so forth. The comparison operation or the addition operation of the fused conditional ternary instruction can be initially performed. A variety of activation functions used in machine learning data models can use the fused conditional ternary instruction. Further, reduction operations of data can include generating an average value of maximum values of two datasets. These reduction operations can also rely on the fused conditional ternary instruction.

In some implementations, the functionality of the computation resources 100 is included as components on a single die, such as a single integrated circuit. In other implementations, the functionality of the computation resources 100 is included as multiple dies on a system-on-a-chip (SOC). In various implementations, the computation resources 100 is used in a desktop, a portable computer, a tablet computer, a smartwatch, a smartphone, or other.

Figure 2:
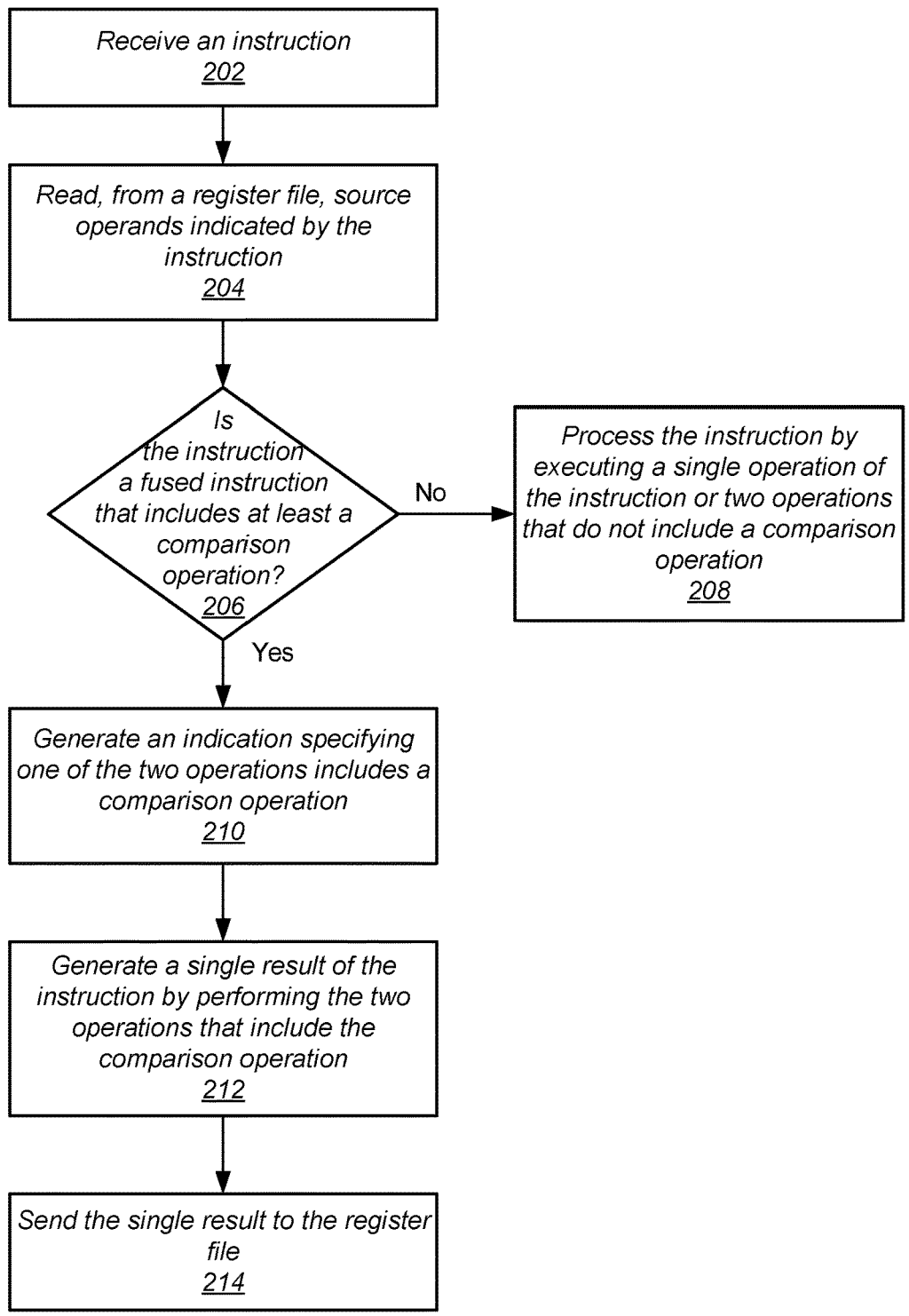
FIG. 2 is a generalized block diagram of a method for efficiently processing pairs of operations repeatedly used in applications.

Referring to FIG. 2, a generalized diagram is shown of a method 200 for efficiently processing pairs of operations repeatedly used in applications. For purposes of discussion, the steps in this implementation (as well as FIG. 5) are shown in sequential order. However, in other implementations some steps occur in a different order than shown, some steps are performed concurrently, some steps are combined with other steps, and some steps are absent.

Circuitry receives an instruction (block 202). In some implementations, the circuitry is within a compute circuit of multiple compute circuits of a parallel data processing circuit with a highly parallel data microarchitecture. A general-purpose processing circuit translates instructions of an application to commands and stores the commands in a ring buffer. The parallel data processing circuit reads the commands from the ring buffer and assigns the commands to the multiple compute circuits. In various implementations, the instruction is a conditional instruction. The circuitry reads, from a register file of the compute circuit, source operands indicated by the instruction (block 204). Therefore, each of the multiple parallel lanes of execution of the compute circuit executes the conditional instruction with each lane using respective data items. In other implementations, another type of processing circuit is used to execute the instructions and the register file is located elsewhere in the processing circuit.

If the instruction is not a fused instruction that includes at least a comparison operation ("no" branch of the conditional block 206), then the circuitry processes the instruction by executing a single operation of the instruction or two operations that do not include a comparison operation (block 208). For example, the instruction is not a fused conditional instruction, and the circuitry sends an indication to an ALU specifying a single operation corresponding to the instruction. Alternatively, the circuitry sends an indication to the ALU specifying a pair of operations corresponding to the instruction where the pair of operations do not include a comparison operation. For example, the pair of operations include a multiplication operation and an addition operation, but no conditions for performing either one of the two operations.

If the instruction is a fused instruction that includes at least a comparison operation ("yes" branch of the conditional block 206), then the circuitry generates an indication specifying one of the two operations includes a comparison operation (block 210). For example, the instruction is a fused conditional instruction, and the circuitry sends an indication to the ALU specifying the pair of operations corresponding to the instruction where the pair of operations include a comparison operation.

In an implementation, the fused instruction is a conditional ternary operation. In various implementations, the fused instruction can include the following format: d=(a comp b)? a+c:b+c. The pair of operations include a comparison operation followed by an addition operation. The comparison operation can generate a result based on two of the three source operands, such as the source operands "a" and "b," and one of multiple comparison types such as a greater than (>) comparison, a greater than or equal to (>=) comparison, a less than (<) comparison, and a less than or equal to (<=) comparison. The operator "comp" of the fused instruction would be replaced with one of the multiple comparison types.

The conditional operator "?" is used to indicate a conditional expression, and the conditional operator "?" indicates a selection occurs between the two source operands such as the source operands "a" and "b." For example, only one of the two source operands ("a" or "b") is combined with the third operand "c" in a second operation. In this implementation, the second operation is an addition operation. Therefore, only one of the two source operands ("a" or "b") is summed with the third operand "c." In other implementations, the second operation is a subtraction operation or another type of operation. One or more of the source operands "a," "b," and "c" can be an integer type or a floating-point type. One or more of the source operands "a," "b," and "c" can be a positive value or negative value. The circuitry generates a single result of the instruction by performing the two operations that include at least the comparison operation used in the conditional expression (block 212). The circuitry sends the single result to the register file (block 214). Moving the two operations (comparison and add) from two separate instructions into the single fused conditional ternary instruction reduces the number of instructions in an application, reduces the size of function calls (libraries), and increases performance.

Figure 3:
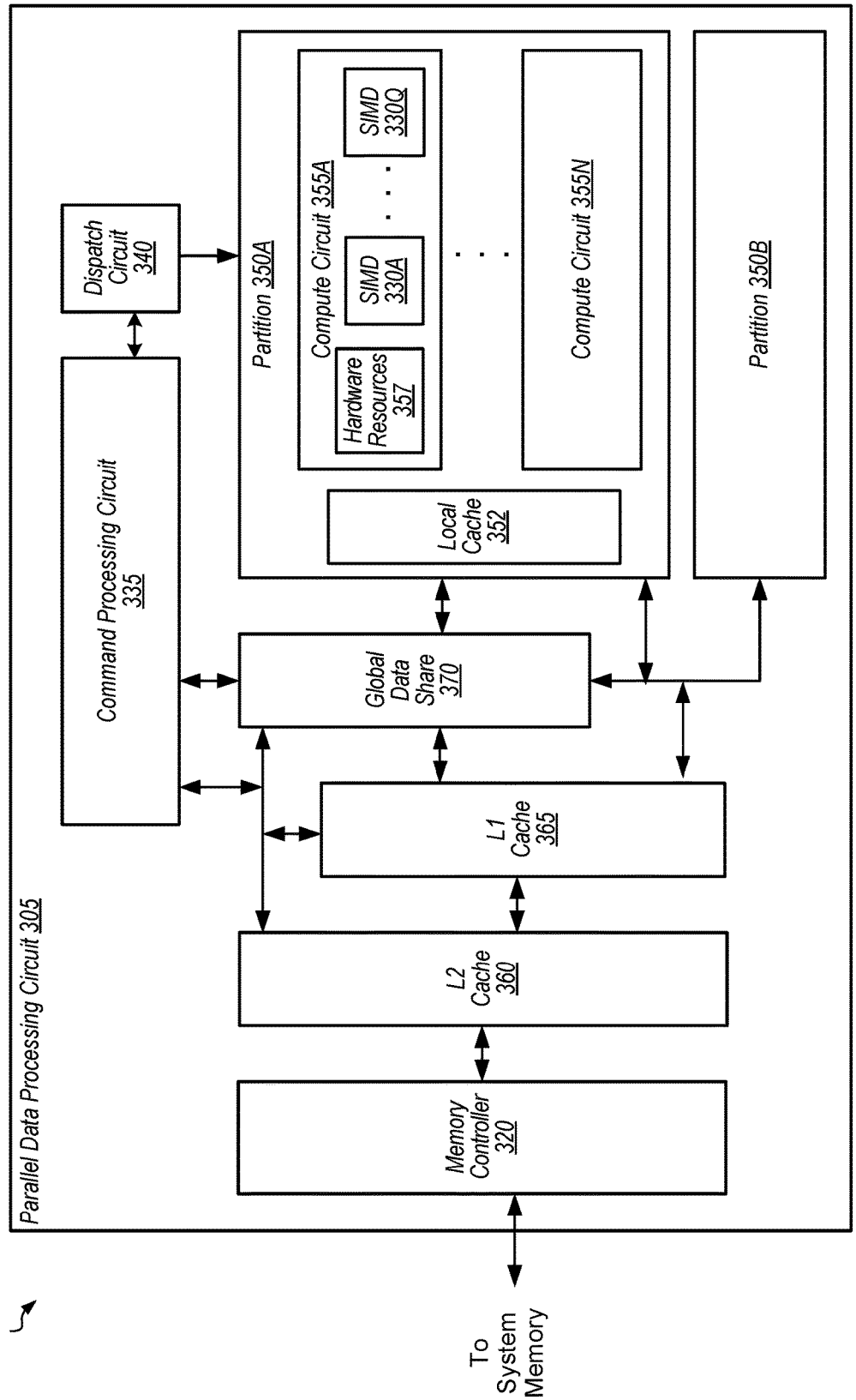
FIG. 3 is a generalized diagram of an apparatus that efficiently process pairs of operations repeatedly used in applications.

Turning now to FIG. 3, a block diagram is shown of an apparatus 300 that efficiently processes pairs of operations repeatedly used in applications. In one implementation, apparatus 300 includes the parallel data processing circuit 305 with an interface to system memory. In an implementation, the parallel data processing circuit 305 is a graphics processing unit (GPU). In various implementations, apparatus 300 executes any of various types of highly parallel data applications. As part of executing an application, a host CPU (not shown) launches kernels to be executed by the parallel data processing circuit 305. The command processing circuit 335 receives kernels from the host CPU and determines when dispatch circuit 340 dispatches wavefronts of these kernels to the compute circuits 355A-355N.

Multiple processes of a highly parallel data application provide multiple kernels to be executed on the compute circuits 355A-355N. Each kernel corresponds to a function call of the highly parallel data application. The parallel data processing circuit 305 includes at least the command processing circuit (or command processor) 335, dispatch circuit 340, compute circuits 355A-355N, memory controller 320, global data share 370, shared level one (L1) cache 365, and level two (L2) cache 360. It should be understood that the components and connections shown for the parallel data processing circuit 305 are merely representative of one type processing circuit and does not preclude the use of other types of processing circuits for implementing the techniques presented herein. The apparatus 300 also includes other components which are not shown to avoid obscuring the figure. In other implementations, the parallel data processing circuit 305 includes other components, omits one or more of the illustrated components, has multiple instances of a component even if only one instance is shown in the apparatus 300, and/or is organized in other suitable manners. Also, each connection shown in the apparatus 300 is representative of any number of connections between components. Additionally, other connections can exist between components even if these connections are not explicitly shown in apparatus 300.

In an implementation, the memory controller 320 directly communicates with each of the partitions 350A-350B and includes circuitry for supporting communication protocols and queues for storing requests and responses. Threads within wavefronts executing on compute circuits 355A-355N read data from and write data to the cache 352, vector general-purpose registers, scalar general-purpose registers, and when present, the global data share 370, the shared L1 cache 365, and the L2 cache 360. When present, it is noted that L1 cache 365 can include separate structures for data and instruction caches. It is also noted that global data share 370, shared L1 cache 365, L2 cache 360, memory controller 320, system memory, and cache 352 can collectively be referred to herein as a "cache memory subsystem".

In various implementations, the circuitry of partition 350B is a replicated instantiation of the circuitry of partition 350A. In some implementations, each of the partitions 350A-350B is a chiplet. As used herein, a "chiplet" is also referred to as an "intellectual property block" (or IP block). However, a "chiplet" is a semiconductor die (or die) fabricated separately from other dies, and then interconnected with these other dies in a single integrated circuit in the MCM. On a single silicon wafer, only multiple chiplets are fabricated as multiple instantiated copies of particular integrated circuitry, rather than fabricated with other functional blocks that do not use an instantiated copy of the particular integrated circuitry. For example, the chiplets are not fabricated on a silicon wafer with various other functional blocks and processors on a larger semiconductor die such as an SoC. A first silicon wafer (or first wafer) is fabricated with multiple instantiated copies of integrated circuitry a first chiplet, and this first wafer is diced using laser cutting techniques to separate the multiple copies of the first chiplet. A second silicon wafer (or second wafer) is fabricated with multiple instantiated copies of integrated circuitry of a second chiplet, and this second wafer is diced using laser cutting techniques to separate the multiple copies of the second chiplet.

In an implementation, the local cache 352 represents a last level shared cache structure such as a local level-two (L2) cache within partition 350A. Additionally, each of the multiple compute circuits 355A-355N includes SIMD circuits 330A-330Q, each with circuitry of multiple parallel computational lanes of simultaneous execution. These parallel computational lanes operate in lockstep. In various implementations, the data flow within each of the lanes is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration.

Each of the ALUs within a given row across the lanes includes the same circuitry and functionality, and operates on the same instruction, but different data, such as a different data item, associated with a different thread. In various implementations, the ALUs of SIMD circuits 330A-330Q include circuitry that support executing a fused instruction that includes a conditional ternary operation. In some implementations, the fused instruction can include the following format: d=(a comp b)? a+c:b+c. The ALUs of SIMD circuits 330A-330Q include the same functionality of ALU 160 (of FIG. 1). Therefore, compute circuits 355A-355N have the same functionality as compute circuits 110A-110D (of FIG. 1). Moving the two operations (comparison and add) from two separate instructions into the single fused conditional ternary instruction that is executed by compute circuits 355A-355N reduces the number of instructions in an application, reduces the size of function calls (libraries), and increases performance.

In addition to the SIMD circuits 330A-330Q, the compute circuit 355A also includes the hardware resources 557. The hardware resources 557 include at least an assigned number of vector general-purpose registers (VGPRs) per thread, an assigned number of scalar general-purpose registers (SGPRs) per wavefront, and an assigned data storage space of a local data store per workgroup. Each of the compute circuits 355A-355N receives wavefronts from the dispatch circuit 340 and stores the received wavefronts in a corresponding local dispatch circuit (not shown). A local scheduler within the compute circuits 355A-355N schedules these wavefronts to be dispatched from the local dispatch circuits to the SIMD circuits 330A-330Q. The cache 352 can be a last level shared cache structure of the partition 350A.

Figure 4:
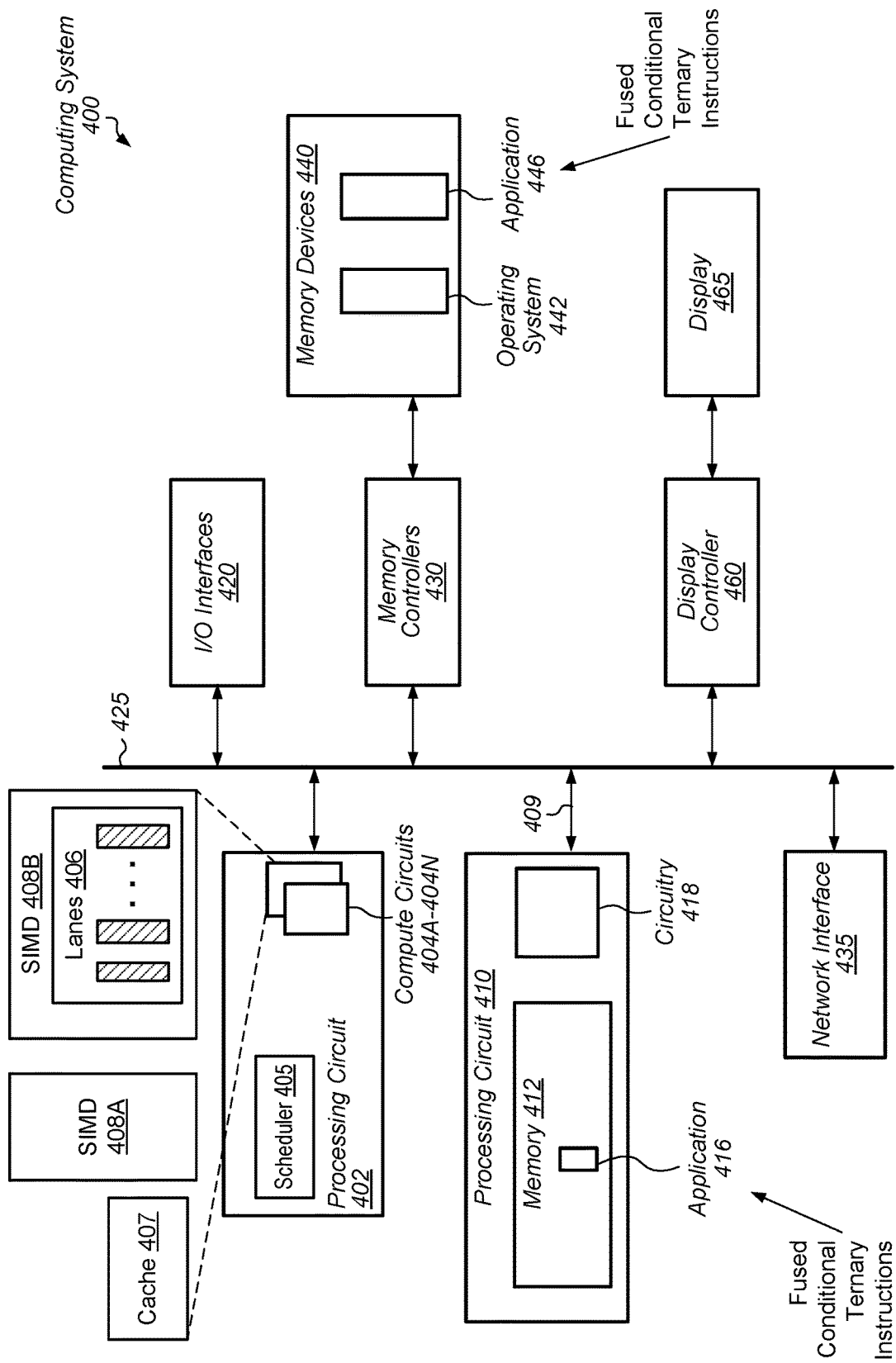
FIG. 4 is a generalized diagram of a computing system that efficiently process pairs of operations repeatedly used in applications.

Turning now to FIG. 4, a generalized diagram is shown of a computing system 400 that efficiently processes cache accesses of an integrated circuit. In an implementation, the computing system 400 includes at least processing circuits 402 and 410, input/output (I/O) interfaces 420, bus 425, network interface 435, memory controllers 430, memory devices 440, display controller 460, and display 465. In other implementations, computing system 400 includes other components and/or computing system 400 is arranged differently. For example, power management circuitry, and phased locked loops (PLLs) or other clock generating circuitry are not shown for ease of illustration. In various implementations, the components of the computing system 400 are on the same die such as a system-on-a-chip (SOC). In other implementations, the components are individual dies in a system-in-package (SiP) or a multi-chip module (MCM). A variety of computing devices use the computing system 400 such as a desktop computer, a laptop computer, a server computer, a tablet computer, a smartphone, a gaming device, a smartwatch, and so on.

Processing circuits 402 and 410 are representative of any number of processing circuits which are included in computing system 400. In an implementation, processing circuit 410 is a general-purpose central processing unit (CPU). In one implementation, processing circuit 402 is a parallel data processing circuit with a highly parallel data microarchitecture, such as a GPU. The processing circuit 402 can be a discrete device, such as a dedicated GPU (dGPU), or the processing circuit 402 can be integrated (an iGPU) in the same package as another processing circuit. Other parallel data processing circuits that can be included in computing system 400 include digital signal processing circuits (DSPs), field programmable gate arrays (FPGAs), application specific integrated circuits (ASICs), and so forth.

In various implementations, the processing circuit 402 includes multiple, replicated compute circuits 404A-404N, each including similar circuitry and components such as the SIMD circuits 408A-408B, the cache 407, and hardware resources (not shown). The SIMD circuit 408A includes replicated circuitry of the circuitry of the SIMD circuit 408A. Although two SIMD circuits are shown, in other implementations, another number of SIMD circuits is used based on design requirements. As shown, the SIMD circuit 408B includes multiple, parallel computational lanes 406. Cache 407 can be used as a shared last-level cache in a compute circuit similar to local cache 552 (of FIG. 5).

The hardware of scheduler 405 assigns wavefronts to be dispatched to the compute circuits 404A-404N. In an implementation, scheduler 405 is a command processing circuit of a GPU. In some implementations, the application 446 stored on the memory devices 440 and its copy (application 416) stored on the memory 412 are a highly parallel data application that includes particular function calls using an API to allow the developer to insert a request in the highly parallel data application for launching wavefronts of a kernel (function call). In an implementation, this kernel launch request is a C++ object, and it is converted by circuitry 418 of the processing circuit 410 to a command. In addition, the application 446 stored on the memory devices 440 and its copy (application 416) stored on the memory 412 include fused conditional ternary instructions. Therefore, the ALUs of SIMD circuits 408A-408B have the same functionality as ALU 160 (of FIG. 1) for supporting these fused instructions. Moving the two operations (comparison and add) from two separate instructions into the single fused conditional ternary instruction that is executed by the ALUs of SIMD circuits 408A-408B reduces the number of instructions in an application, reduces the size of function calls (libraries), and increases performance.

In some implementations, application 446 is a highly parallel data application that provides multiple kernels to be executed on the compute circuits 404A-404N. The high parallelism offered by the hardware of the compute circuits 404A-404N is used for real-time data processing. Examples of real-time data processing are rendering multiple pixels, image blending, pixel shading, vertex shading, and geometry shading. In such cases, each of the data items of a wavefront is a pixel of an image. The compute circuits 404A-404N can also be used to execute other threads that require operating simultaneously with a relatively high number of different data elements (or data items). Examples of these threads are threads for scientific, medical, finance and encryption/decryption computations.

Memory 412 represents a local hierarchical cache memory subsystem. Memory 412 stores source data, intermediate results data, results data, and copies of data and instructions stored in memory devices 440. Processing circuit 410 is coupled to bus 425 via interface 406. Processing circuit 410 receives, via interface 406, copies of various data and instructions, such as the operating system 442, one or more device drivers, one or more applications such as application 446, and/or other data and instructions. The processing circuit 410 retrieves a copy of the application 446 from the memory devices 440, and the processing circuit 410 stores this copy as application 416 in memory 412.

In some implementations, computing system 400 utilizes a communication fabric ("fabric"), rather than the bus 425, for transferring requests, responses, and messages between the processing circuits 402 and 410, the I/O interfaces 420, the memory controllers 430, the network interface 435, and the display controller 450. When messages include requests for obtaining targeted data, the circuitry of interfaces within the components of computing system 400 translates target addresses of requested data. In some implementations, the bus 425, or a fabric, includes circuitry for supporting communication, data transmission, network protocols, address formats, interface signals and synchronous/asynchronous clock domain usage for routing data.

Memory controllers 430 are representative of any number and type of memory controllers accessible by processing circuits 402 and 410. While memory controllers 430 are shown as being separate from processing circuits 402 and 410, it should be understood that this merely represents one possible implementation. In other implementations, one of memory controllers 430 is embedded within one or more of processing circuits 402 and 410 or it is located on the same semiconductor die as one or more of processing circuits 402 and 410. Memory controllers 430 are coupled to any number and type of memory devices 440.

Memory devices 440 are representative of any number and type of memory devices. For example, the type of memory in memory devices 440 includes Dynamic Random Access Memory (DRAM), Static Random Access Memory (SRAM), NAND Flash memory, NOR flash memory, Ferroelectric Random Access Memory (FeRAM), or otherwise. Memory devices 440 store at least instructions of an operating system 442, one or more device drivers, and application 446. In some implementations, application 446 is a highly parallel data application such as a video graphics application, a shader application, or other. Copies of these instructions can be stored in a memory or cache device local to processing circuit 410 and/or processing circuit 402.

I/O interfaces 420 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB). Various types of peripheral devices (not shown) are coupled to I/O interfaces 420. Such peripheral devices include (but are not limited to) displays, keyboards, mice, printers, scanners, joysticks or other types of game controllers, media recording devices, external storage devices, and so forth. Network interface 135 receives and sends network messages across a network.

Figure 5:
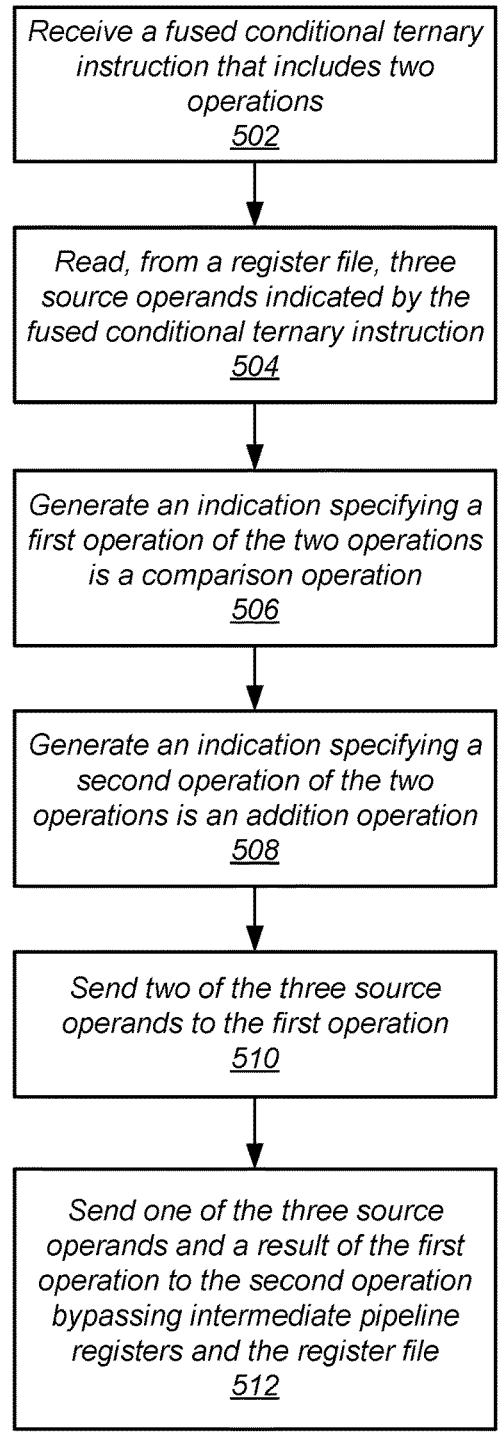
FIG. 5 is a generalized block diagram of a method for efficiently processing pairs of operations repeatedly used in applications.

Turning now to FIG. 5, a generalized diagram is shown of a method 500 for efficiently processing pairs of operations repeatedly used in applications. Circuitry receives a fused conditional ternary instruction that includes two operations (block 502). In some implementations, the circuitry is within a compute circuit of multiple compute circuits of a parallel data processing circuit with a highly parallel data microarchitecture. The circuitry reads, from a register file of the compute circuit, three source operands indicated by the fused conditional ternary instruction (block 504). Therefore, each of the multiple parallel lanes of execution of the compute circuit executes the fused conditional ternary instruction with each lane using respective data items. In other implementations, another type of processing circuit is used to execute the instructions and the register file is located elsewhere in the processing circuit.

The circuitry generates an indication specifying a first operation of the two operations is a comparison operation (block 506). The fused conditional ternary instruction can include the following format: d=(a comp b)? a+c:b+c. The pair of operations include a comparison operation followed by an addition operation. The comparison operation can generate a result based on two of the three source operands, such as the source operands "a" and "b," and one of a greater than (>) comparison, a greater than or equal to (>=) comparison, a less than (<) comparison, and a less than or equal to (<=) comparison. The circuitry generates an indication specifying a second operation of the two operations is an addition operation (block 508). In other implementations, it is possible and contemplated that the order of the operations can be reversed with the addition operation occurring prior to the comparison operation. Additionally, the addition operation can include negative source operands causing a subtraction operation to be performed. In yet another implementation, the addition operation is replaced with one of a variety of Boolean combinatorial logic operations. The circuitry sends two of the three source operands to the first operation (block 510). The circuitry sends one of the three source operands and a result of the first operation to the second operation bypassing intermediate pipeline registers and the register file (block 512).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
a register file configured to store data; and
circuitry configured to:
read, from the register file, three source operands indicated by an instruction;
responsive to the instruction being a fused instruction comprising two different operations with one being a comparison operation:
generate an indication that a first operation of the two different operations comprises a comparison operation;
generate a single result of the instruction as an output of a second operation of the two different operations; and
send the single result to the register file.

2. The integrated circuit as recited in claim 1, wherein the circuitry is further configured to send the indication to a plurality of arithmetic logic units (ALUs) in a same pipeline stage.

3. The integrated circuit as recited in claim 2, wherein each of the plurality of ALUs is configured to generate a corresponding single result of the instruction.

4. The integrated circuit as recited in claim 3, wherein the instruction is used as an activation function of a machine learning data model.

5. The integrated circuit as recited in claim 1, wherein the circuitry is further configured to generate an indication specifying the second operation of the two different operations comprises an addition operation.

6. The integrated circuit as recited in claim 5, wherein the circuitry is further configured to:
send two of the three source operands to the comparison operation; and
send one of the three source operands and a result of the comparison operation to the addition operation, bypassing intermediate pipeline registers and the register file.

7. The integrated circuit as recited in claim 5, wherein the circuitry is further configured to:
send two of the three source operands to the addition operation; and
send one of the three source operands and a result of the addition operation to the comparison operation, bypassing intermediate pipeline registers and the register file.

8. A method comprising:
reading, by circuitry from a register file, three source operands indicated by an instruction;
responsive to the instruction being a fused instruction comprising two different operations with one being a comparison operation:
generating, by the circuitry, an indication that a first operation of the two different operations comprises a comparison operation;
generating, by the circuitry, a single result of the instruction as an output of a second operation of the two different operations; and
sending, by the circuitry, the single result to the register file.

9. The method as recited in claim 8, further comprising sending, by the circuitry, the indication to a plurality of arithmetic logic units (ALUs) in a same pipeline stage.

10. The method as recited in claim 9, further comprising generating, by each of the plurality of ALUs, a corresponding single result of the instruction.

11. The method as recited in claim 10, wherein the instruction is used as an activation function of a machine learning data model.

12. The method as recited in claim 11, further comprising generating, by the circuitry, an indication specifying the second operation of the two different operations comprises an addition operation.

13. The method as recited in claim 12, further comprising:
sending, by the circuitry, two of the three source operands to the comparison operation; and
sending, by the circuitry, one of the three source operands and a result of the comparison operation to the addition operation bypassing intermediate pipeline registers and the register file.

14. The method as recited in claim 12, further comprising:
sending, by the circuitry, two of the three source operands to the addition operation; and
sending, by the circuitry, one of the three source operands and a result of the addition operation to the comparison operation bypassing intermediate pipeline registers and the register file.

15. A computing system comprising:
a memory comprising a plurality of instructions; and
a plurality of compute circuits, each comprising:
a register file configured to store data; and
circuitry configured to:
receive the plurality of instructions;
read, from the register file, three source operands indicated by a given instruction of the plurality of instructions;
responsive to the given instruction being a fused instruction comprising two different operations with one being a comparison operation:
generate an indication that a first operation of the two different operations comprises a comparison operation;
generate a single result of the given instruction as an output of a second operation of the two different operations; and
send the single result to the register file.

16. The computing system as recited in claim 15, wherein the circuitry is further configured to send the indication to a plurality of arithmetic logic units (ALUs) in a same pipeline stage.

17. The computing system as recited in claim 16, wherein each of the plurality of ALUs is configured to generate a corresponding single result of the given instruction of the plurality of instructions.

18. The computing system as recited in claim 17, wherein the given instruction is used as an activation function of a machine learning data model.

19. The computing system as recited in claim 15, wherein the circuitry is further configured to generate an indication specifying the second operation of the two different operations comprises an addition operation.

20. The computing system as recited in claim 19, wherein the circuitry is further configured to:
send two of the three source operands to the comparison operation; and
send one of the three source operands and a result of the comparison operation to the addition operation, bypassing intermediate pipeline registers and the register file.

* * * * *